United States Patent
Zich

(10) Patent No.: US 6,927,540 B1
(45) Date of Patent: Aug. 9, 2005

(54) TAILGATE CONTROLLED LIGHT SYSTEM

(76) Inventor: Justin D. Zich, 232 Kuchenski Dr., #6, Dickinson, ND (US) 58601

( * ) Notice: Subject to any disclaimer, the term of this patent is extended or adjusted under 35 U.S.C. 154(b) by 0 days.

(21) Appl. No.: 10/600,896

(22) Filed: Jun. 20, 2003

(51) Int. Cl.$^7$ .................................................. B60Q 7/00
(52) U.S. Cl. ............................ 315/84; 315/77; 307/9.1; 307/10.4; 362/540
(58) Field of Search ............................... 315/77, 83, 84; 307/9.1, 10.4, 10.8; 362/485, 540, 543; 340/457, 459

(56) References Cited

U.S. PATENT DOCUMENTS

| | | | | |
|---|---|---|---|---|
| 4,745,525 A | 5/1988 | Sheehy | ........................ | 362/32 |
| 4,818,006 A | 4/1989 | Arndt | ........................ | 296/32 |
| 4,839,629 A | 6/1989 | Brown | ........................ | 340/468 |
| 5,144,538 A | 9/1992 | Harris | ........................ | 362/80 |
| 5,258,893 A | 11/1993 | Finneyfrock | ................. | 362/61 |
| 5,368,232 A * | 11/1994 | Schroeder | ................... | 239/165 |
| 5,495,400 A | 2/1996 | Currie | ........................ | 362/32 |
| 5,795,051 A | 8/1998 | Galanski | ...................... | 362/80 |
| 5,844,367 A * | 12/1998 | Agans, Jr. | ..................... | 315/84 |
| 6,000,821 A | 12/1999 | Beliakoff | ..................... | 362/485 |
| 6,116,761 A | 9/2000 | Munsey | ....................... | 362/484 |
| 6,151,809 A * | 11/2000 | Altheide | ....................... | 37/268 |
| 6,238,068 B1 | 5/2001 | Farmer, Jr. | ................... | 362/485 |
| 6,431,717 B1 | 8/2002 | Anderson et al. | ............. | 362/31 |
| 6,727,806 B1 * | 4/2004 | Massie et al. | ......... | 340/426.24 |

* cited by examiner

Primary Examiner—Haissa Philogene

(57) ABSTRACT

A tailgate controlled light system for automatically illuminating the interior of a pickup box upon opening of a tailgate. The tailgate controlled light system includes a light unit attachable within a pickup box, a control switch electrically connected to the light unit and attachable within the opening of the pickup box, and an override switch electrically connected to the control switch and to the vehicle power supply. The control switch is positioned to be depressed by the tailgate when closed thereby terminating power to the light unit. When the tailgate is opened away from the control switch the light unit is activated with power. The override switch is used to terminate power to the light unit regardless of the position of the tailgate.

4 Claims, 6 Drawing Sheets

TAILGATE CONTROLLED LIGHT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to pickup box lights and more specifically it relates to a tailgate controlled light system for automatically illuminating the interior of a pickup box upon opening of a tailgate.

2. Description of the Related Art

Pickup box lights have been in use for years. A conventional pickup box light is mounted to the upper rear portion of the cab of the pickup and has a manual control switch for users to operate that controls the light.

The main disadvantage of conventional pickup box lights is that they do not automatically operate to illuminate the interior of the pickup box during loading/unloading of cargo. Another disadvantage of conventional pickup box lights is that require the user to physically locate and manipulate a switch to turn the lights on. Another problem with conventional pickup box lights is that when a pickup box cover is utilized the light is blocked by the cover if the cover is closed.

Examples of patented devices which may be related to the present invention include U.S. Pat. No. 5,495,400 to Currie; U.S. Pat. No. 6,238,068 to Farmer, Jr.; U.S. Pat. No. 6,431,717 to Anderson et al.; U.S. Pat. No. 5,795,051 to Galanski; U.S. Pat. No. 4,745,525 to Sheehy; U.S. Pat. No. 5,258,893 to Finneyfrock; U.S. Pat. No. 6,116,761 to Munsey; U.S. Pat. No. 4,839,629 to Brown; U.S. Pat. No. 4,818,006 to Arndt; U.S. Pat. No. 6,000,821 to Beliakoff; and U.S. Pat. No. 5,144,538 to Harris.

While these devices may be suitable for the particular purpose to which they address, they are not as suitable for automatically illuminating the interior of a pickup box upon opening of a tailgate. Conventional pickup box lights do not allow for automatic operation thereof based upon the opening of a tailgate.

In these respects, the tailgate controlled light system according to the present invention substantially departs from the conventional concepts and designs of the prior art, and in so doing provides an apparatus primarily developed for the purpose of automatically illuminating the interior of a pickup box upon opening of a tailgate.

BRIEF SUMMARY OF THE INVENTION

In view of the foregoing disadvantages inherent in the known types of pickup box lights now present in the prior art, the present invention provides a new tailgate controlled light system construction wherein the same can be utilized for automatically illuminating the interior of a pickup box upon opening of a tailgate.

The general purpose of the present invention, which will be described subsequently in greater detail, is to provide a new tailgate controlled light system that has many of the advantages of the pickup box lights mentioned heretofore and many novel features that result in a new tailgate controlled light system which is not anticipated, rendered obvious, suggested, or even implied by any of the prior art pickup box lights, either alone or in any combination thereof.

To attain this, the present invention generally comprises a light unit attachable within a pickup box, a control switch electrically connected to the light unit and attachable within the opening of the pickup box, and an override switch electrically connected to the control switch and to the vehicle power supply. The control switch is positioned to be depressed by the tailgate when closed thereby terminating power to the light unit. When the tailgate is opened away from the control switch the light unit is activated with power. The override switch is used to terminate power to the light unit regardless of the position of the tailgate.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tailgate controlled light system that will overcome the shortcomings of the prior art devices.

A second object is to provide a tailgate controlled light system for automatically illuminating the interior of a pickup box upon opening of a tailgate.

Another object is to provide a tailgate controlled light system that may be utilized within various brands and designs of pickups.

An additional object is to provide a tailgate controlled light system that may be installed upon an existing pickup as an aftermarket item or installed during the manufacture of a new pickup.

A further object is to provide a tailgate controlled light system that increases the visibility within a pickup box for loading/unloading cargo, particularly where a pickup box cover is secured over the box.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
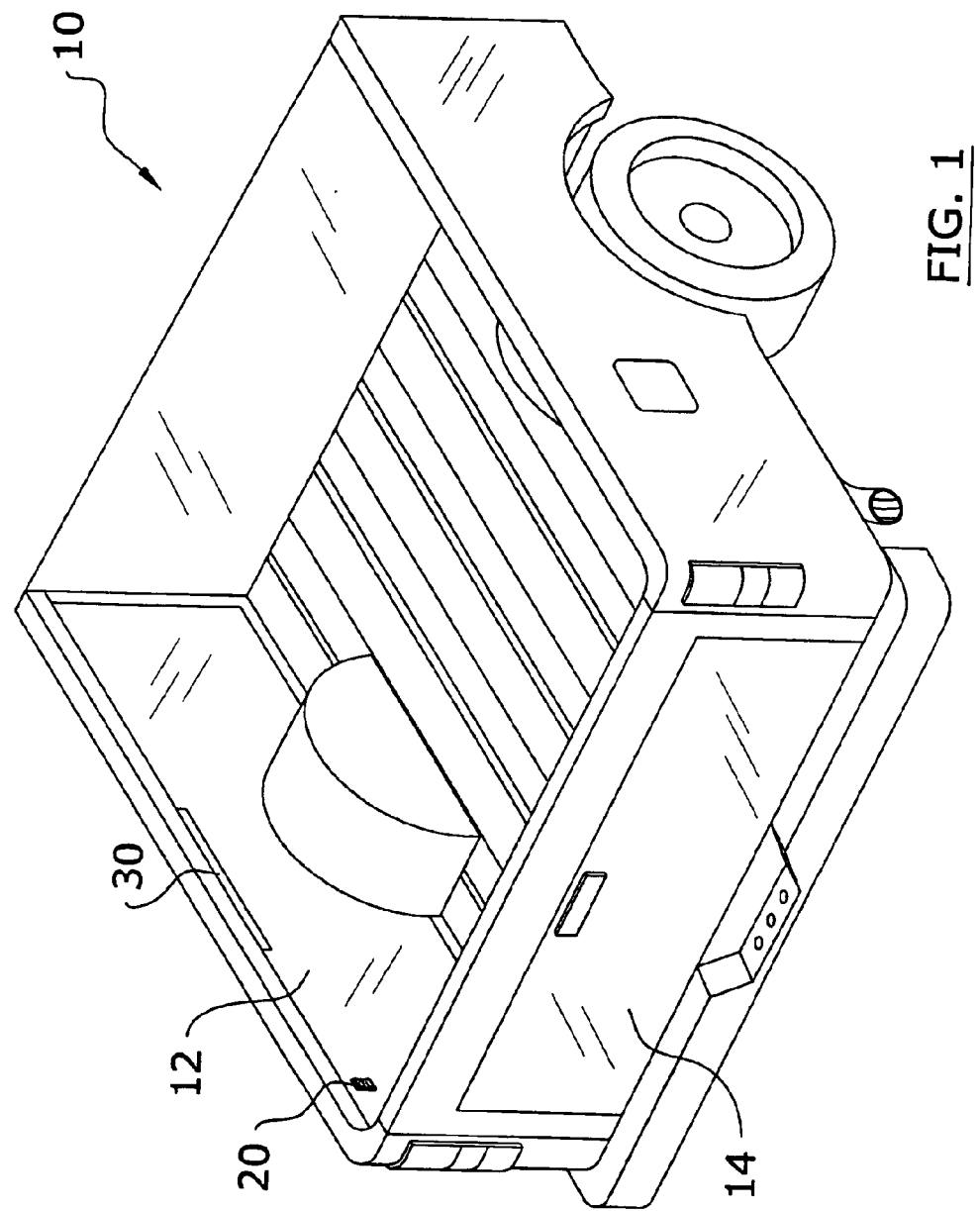
FIG. 1 is an upper perspective view of the present invention mounted within a pickup box with the tailgate closed.

Turning now descriptively to the drawings, in which similar reference characters denote similar elements throughout the several views, FIGS. 1 through 6 illustrate a tailgate controlled light system 10, which comprises a light unit 30 attachable within a pickup box 12, a control switch 40 electrically connected to the light unit 30 and attachable within the opening of the pickup box 12, and an override switch 20 electrically connected to the control switch 40 and to the vehicle power supply. The control switch 40 is positioned to be depressed by the tailgate 14 when closed thereby terminating power to the light unit 30. When the tailgate 14 is opened away from the control switch 40 the light unit 30 is activated with power. The override switch 20 is used to terminate power to the light unit 30 regardless of the position of the tailgate 14.

B. Light Unit

As shown in FIGS. 1 through 5 of the drawings, the light unit 30 is attached within the pickup box 12. The light unit 30 may be comprised of one or more conventional lights. The light unit 30 may be comprised of any illumination structure capable of illuminating the interior of a pickup box 12.

Figure 4:
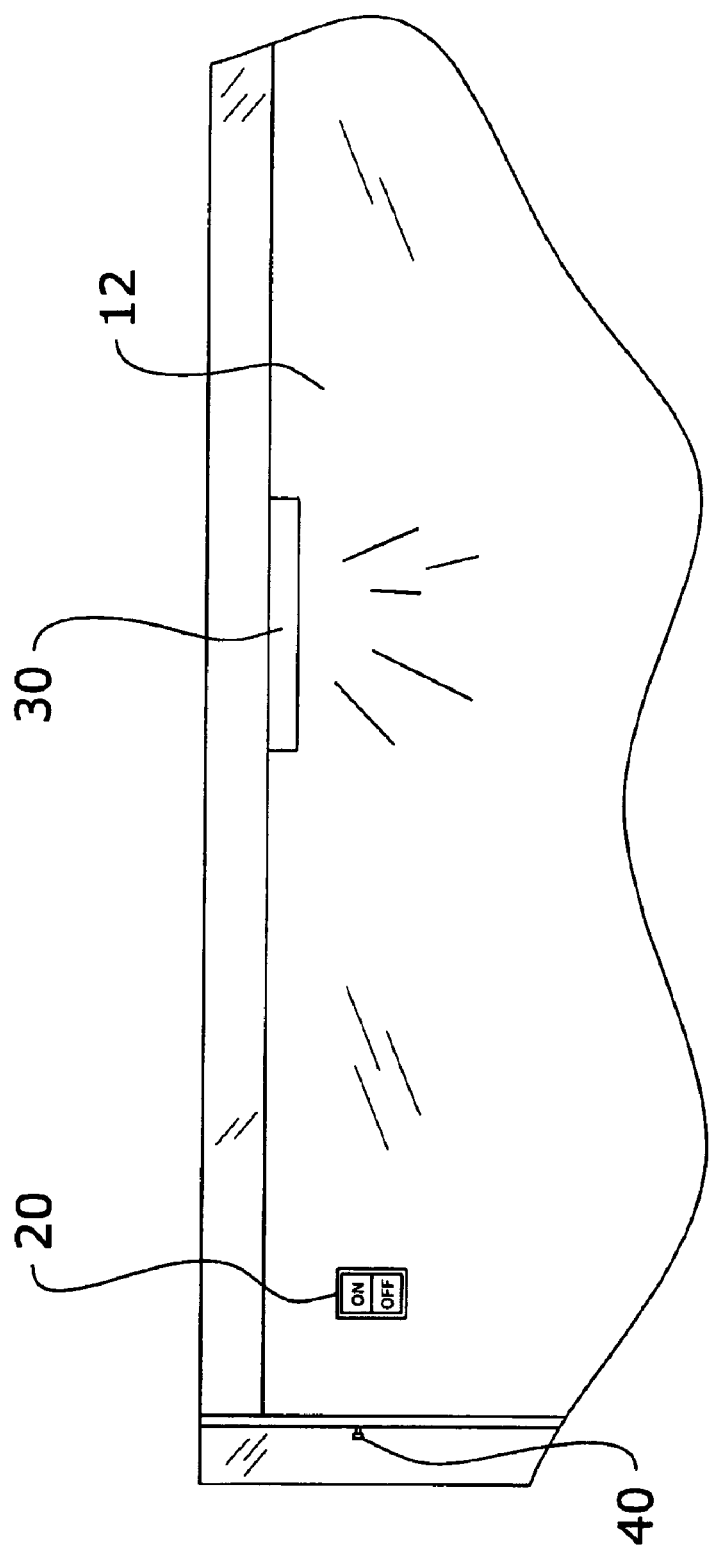
FIG. 4 is a side cutaway view of the present invention attached within the pickup box of a vehicle.
Figure 5:
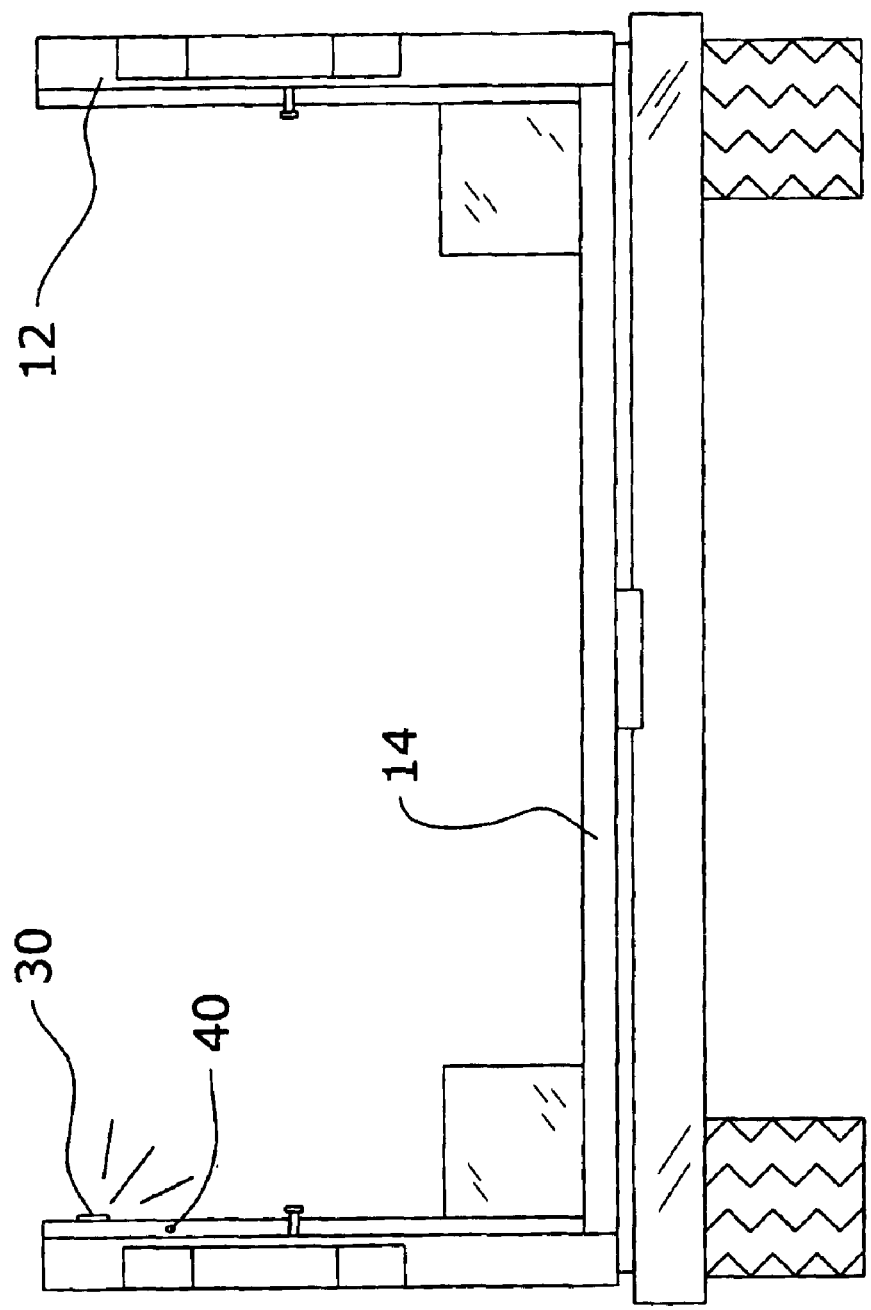
FIG. 5 is a rear view of the present invention attached within the pickup box of a vehicle.

The light unit 30 is preferably positioned beneath a bedrail of a pickup box 12 as best illustrated in FIGS. 4 and 5 of the drawings. The light unit 30 positioned under the bedrail allows for the illumination of the interior of the pickup box 12 regardless if a pickup box 12 cover is utilized. The light unit 30 may be positioned within various other locations within the pickup box 12 to provide adequate lighting.

C. Control Switch

Figure 6:
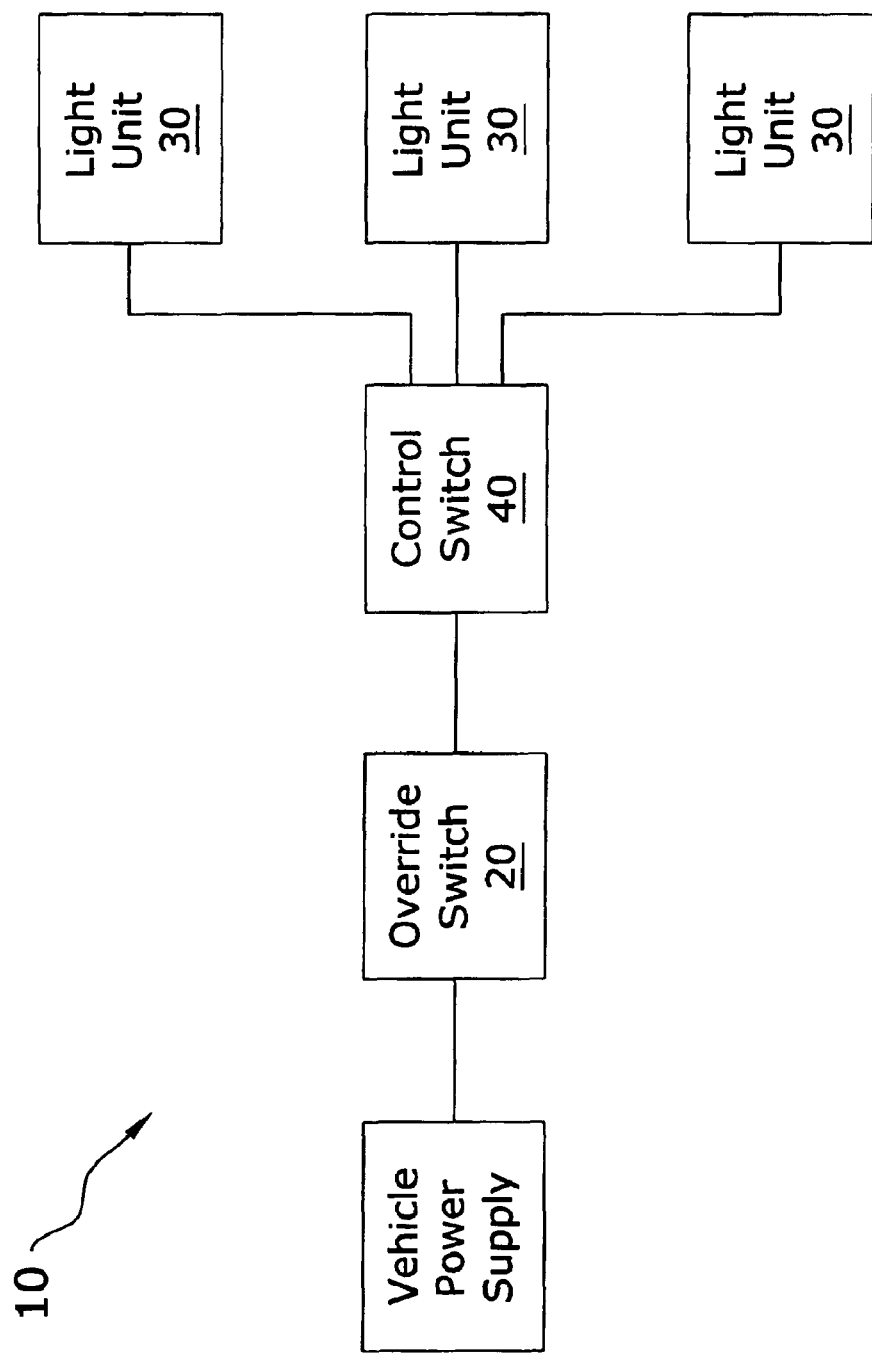
FIG. 6 is a block diagram of the present invention illustrating the electrical connections of each component.

The control switch 40 is electrically connected to the light unit 30 as shown in FIG. 6 of the drawings. The control switch 40 is controlled by and engageable by the tailgate 14 for opening/closing the control switch 40. When the tailgate 14 is closed, the control switch 40 is opened thereby terminating electrical power to the light unit 30. When the tailgate 14 is opened, the control switch 40 is closed thereby providing electrical power to the light unit 30. The control switch 40 is preferably attached to the upper inside lip of the pickup box 12 opening as best shown in FIGS. 2 through 5 of the drawings.

Figure 2:
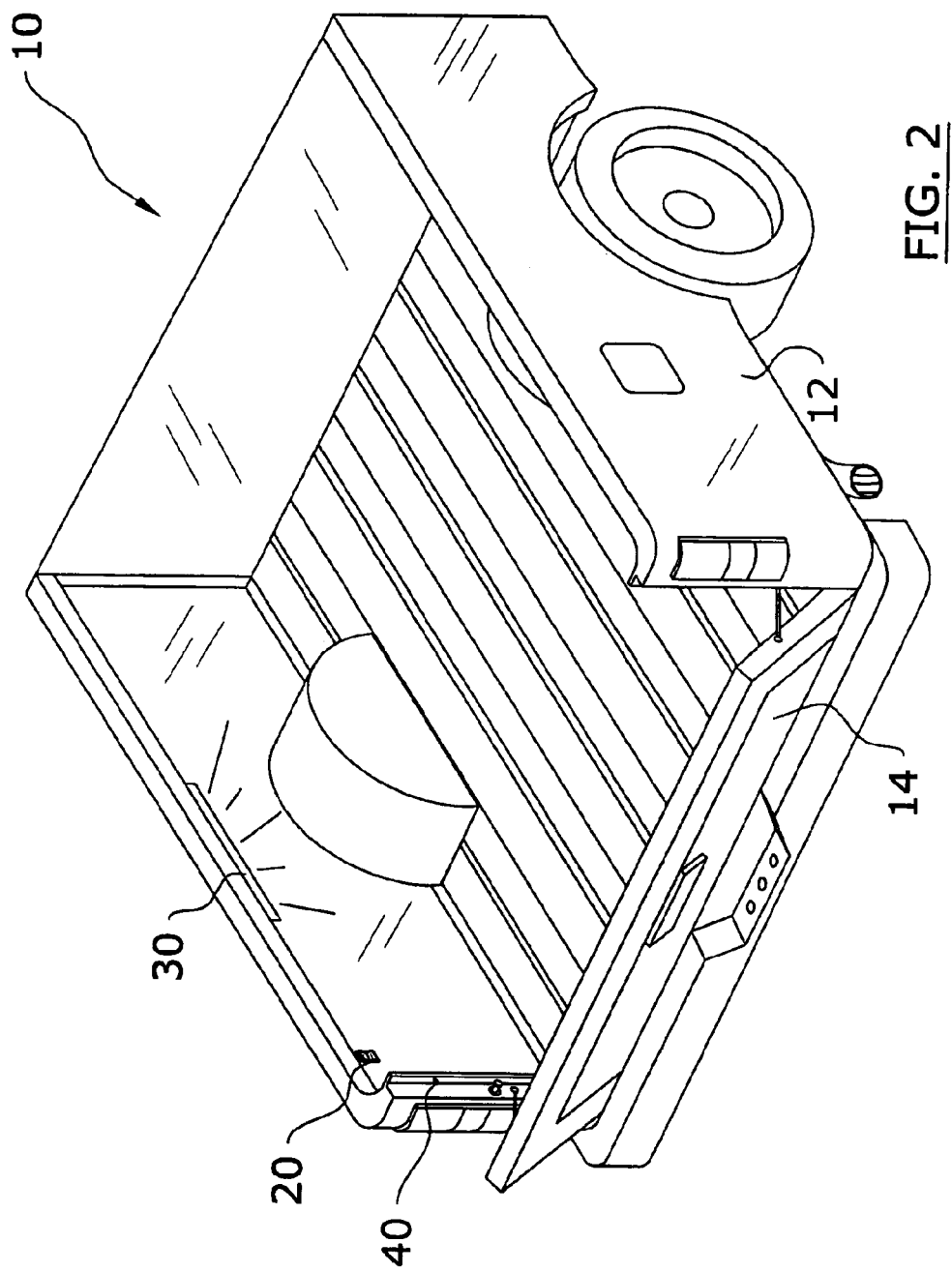
FIG. 2 is an upper perspective view of the present invention mounted within a pickup box with the tailgate partially opened thereby causing the light unit to be illuminated.
Figure 3:
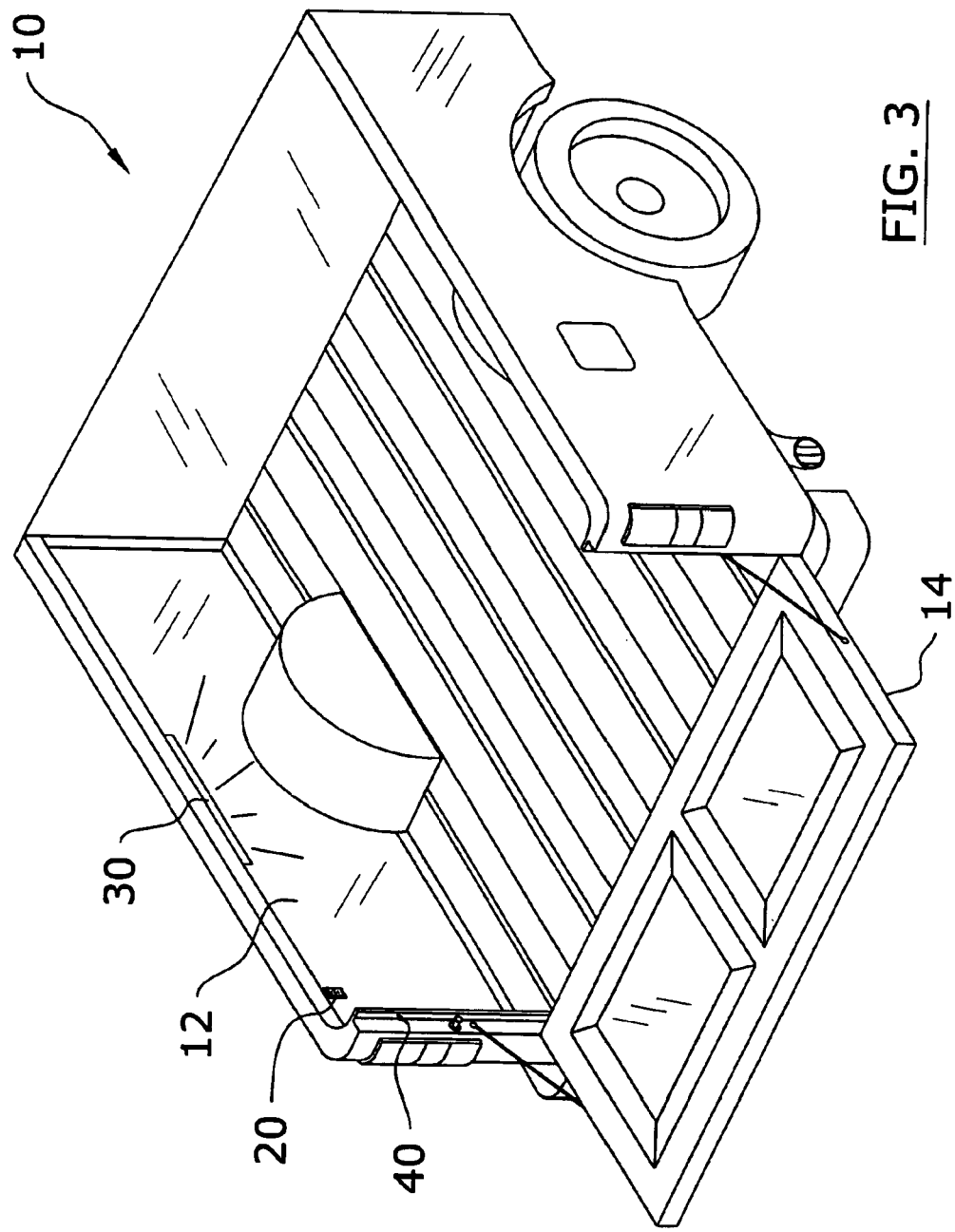
FIG. 3 is an upper perspective view of the present invention mounted within a pickup box with the tailgate fully opened thereby causing the light unit to be illuminated.

FIGS. 4 and 5 best illustrate that the control switch 40 is preferably comprised of a depress switch structure. The control switch 40 is positioned to be engaged by the tailgate 14 when the tailgate 14 is closed. When the tailgate 14 is opened, the control switch 40 is allowed to be closed thereby providing electrical power to the light unit 30 as shown in FIGS. 2 and 3 of the drawings. Various other switch structures may be utilized to construct the control switch 40.

D. Override Switch

The override switch 20 is electrically connected to the control switch 40 for allowing override control over the present invention. The override switch 20 allows for a user to terminate power to the light unit 30 regardless of a position of a tailgate 14. The override switch 20 is also electrically connectable to a power source as shown in FIG. 6 of the drawings. The power source may be comprised of the pickup power supply or a portable power supply.

As shown in FIG. 4 of the drawings, the override switch 20 is preferably positioned within a sidewall of the pickup box 12. However, the override switch 20 may be positioned in various other locations within the pickup box 12. The override switch 20 preferably has two selections: On or Off.

E. Operation

In use, the user opens the tailgate 14 of the pickup to load/unload cargo. When the tailgate 14 is partially opened as shown in FIG. 2 of the drawings, the control switch 40 is allowed to close thereby providing electrical power to the light unit 30. The user is thereafter able to view the interior of the pickup box 12 and perform their desired task. When the user is finished accessing the interior of the pickup box 12, the user the closes the tailgate 14 which causes the tailgate 14 to engage and depress the control switch 40 which terminates the power to the light unit 30. If the user desires to override the operation of the present invention, the user simply manipulates the override switch 20 to prevent electrical power from being provided to the light unit 30 regardless of the position of the tailgate 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate controlled light system, comprising:

a light unit attached beneath a bedrail of a pickup box;

a control switch electrically connected to said light unit and engageable by a tailgate for opening said control switch, wherein said control switch is comprised of a depress switch and wherein said control switch is positioned to be engaged by said tailgate when said tailgate is closed within said pickup box; and an override switch electrically connected to said control switch;

wherein said override switch allows a user to terminate power to said light unit regardless of a position of said tailgate;

wherein said override switch is attached to a sidewall of said pickup box.

2. The tailgate controlled light system of claim 1, wherein said override switch is electrically connectable to a power source.

3. The tailgate controlled light system of claim 1, wherein said power source is comprised of a pickup power supply.

4. The tailgate controlled light system of claim 1, wherein said power source is comprised of a portable power supply.

* * * * *